United States Patent
Pfadler et al.

(10) Patent No.: US 11,912,312 B2
(45) Date of Patent: Feb. 27, 2024

(54) SYSTEM, VEHICLE, NETWORK COMPONENT, APPARATUSES, METHODS, AND COMPUTER PROGRAMS FOR A TRANSPORTATION VEHICLE AND A NETWORK COMPONENT

(71) Applicant: VOLKSWAGEN AKTIENGESELLSCHAFT, Wolfsburg (DE)

(72) Inventors: Andreas Pfadler, Berlin (DE); Israel Gonzalez Vazquez, Wolfsburg (DE); Ahmad El Assaad, Wolfsburg (DE); Daniel Reimann, Braunschweig (DE); Guillaume Jornod, Berlin (DE); Andreas Kwoczek, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 129 days.

(21) Appl. No.: 16/774,593

(22) Filed: Jan. 28, 2020

(65) Prior Publication Data
US 2020/0242920 A1     Jul. 30, 2020

(30) Foreign Application Priority Data

Jan. 29, 2019  (EP) ..................................... 19154194
Feb. 22, 2019  (EP) ..................................... 19158934

(51) Int. Cl.
*B60W 60/00* (2020.01)
*B60W 40/04* (2006.01)
(Continued)

(52) U.S. Cl.
CPC ........ *B60W 60/0059* (2020.02); *B60W 40/04* (2013.01); *B60W 60/0053* (2020.02);
(Continued)

(58) Field of Classification Search
CPC ........ B60W 60/0059; B60W 60/0053; B60W 40/04; G01C 21/362; G01C 21/3647;
(Continued)

(56) References Cited

U.S. PATENT DOCUMENTS 4,855,822 A * 8/1989 Narendra ............. G05D 1/0038
                                                      701/28
9,874,877 B2    1/2018 Meinecke et al.
(Continued)

FOREIGN PATENT DOCUMENTS

CN      101163615 A     4/2008
CN      108698696 A     10/2018
(Continued)

OTHER PUBLICATIONS

Search Report for European Patent Application No. 19158934.0; dated Jul. 30, 2019.
(Continued)

*Primary Examiner* — Donald J Wallace
(74) *Attorney, Agent, or Firm* — Barnes & Thornburg LLP (57) ABSTRACT

A system, a transportation vehicle, a network component, apparatuses, methods, and computer programs for a transportation vehicle and a network component. The method for a transportation vehicle to determine a route section includes operating the transportation vehicle in an automated driving mode and determining an exceptional traffic situation. The method also includes transmitting information related to the exceptional traffic situation to a network component using a mobile communication system and receiving information related to driving instructions for the route section to overcome the exceptional traffic situation from the network component, wherein the receiving of the driving instructions
(Continued)

includes tele-operating the transportation vehicle along the route section to overcome the exceptional traffic situation.

19 Claims, 6 Drawing Sheets

(51) Int. Cl.
    *G01C 21/36* (2006.01)
    *G05D 1/00* (2006.01)
    *G07C 5/00* (2006.01)
    *G08G 1/01* (2006.01)
    *G06V 20/56* (2022.01)

(52) U.S. Cl.
    CPC ....... *G01C 21/362* (2013.01); *G01C 21/3647* (2013.01); *G01C 21/3691* (2013.01); *G05D 1/0038* (2013.01); *G05D 1/0088* (2013.01); *G05D 1/0212* (2013.01); *G06V 20/56* (2022.01); *G07C 5/008* (2013.01); *G08G 1/0133* (2013.01); *G05D 2201/0213* (2013.01)

(58) Field of Classification Search
    CPC ............. G01C 21/3691; G05D 1/0038; G05D 1/0088; G05D 1/0212; G05D 2201/0213; G06K 9/00791; G07C 5/008; G08G 1/0133; G06V 20/56
    See application file for complete search history.

(56) References Cited

U.S. PATENT DOCUMENTS

| | | | |
|---|---|---|---|
| 10,429,854 B2 | 10/2019 | Darms et al. | |
| 10,577,081 B2 | 3/2020 | Baca et al. | |
| 2005/0119801 A1* | 6/2005 | Florentin | G05D 1/0022 348/148 |
| 2016/0139594 A1 | 5/2016 | Okumura et al. | |
| 2016/0148447 A1 | 5/2016 | Moon | |
| 2017/0045885 A1* | 2/2017 | Okumura | G05D 1/0022 |
| 2017/0166207 A1 | 6/2017 | Darms et al. | |
| 2017/0192423 A1 | 7/2017 | Rust et al. | |
| 2018/0164804 A1 | 6/2018 | Hou et al. | |
| 2018/0322775 A1 | 11/2018 | Chase et al. | |
| 2018/0348750 A1 | 12/2018 | Lupa et al. | |
| 2019/0011910 A1* | 1/2019 | Lockwood | G08G 1/20 |
| 2019/0278298 A1* | 9/2019 | Pedersen | G05D 1/0038 |
| 2019/0317491 A1* | 10/2019 | Kobayashi | G07C 5/008 |
| 2019/0361436 A1 | 11/2019 | Ueda et al. | |
| 2020/0036644 A1* | 1/2020 | Belogolovy | H04L 1/0014 |
| 2021/0132604 A1* | 5/2021 | Gillett | B60W 40/08 |
| 2021/0179137 A1* | 6/2021 | Gillett | G01C 21/3415 |

FOREIGN PATENT DOCUMENTS

| | | |
|---|---|---|
| DE | 102015213743 A1 | 1/2017 |
| DE | 102015225238 A1 | 6/2017 |
| DE | 102015225241 A1 | 6/2017 |
| DE | 102015225242 A1 | 6/2017 |
| DE | 102016225606 A1 | 6/2018 |
| JP | 2015001869 A | 1/2015 |
| KR | 20160062259 A | 6/2016 |
| WO | 2018106752 A1 | 6/2018 |
| WO | 2018155159 A1 | 8/2018 |
| WO | 2018232032 A1 | 12/2018 |

OTHER PUBLICATIONS

Office Action for Korean Patent Application No. 10-2020-0010363; dated Jan. 29, 2021.
Office Action for Korean Patent Application No. 10-2020-0010363; dated Jan. 7, 2022.
Office Action; Chinese Patent Application No. 202010078791.5; dated Oct. 10, 2022.
Office Action; European Patent Application No. 19158934.0; dated Sep. 1, 2022.

* cited by examiner

SYSTEM, VEHICLE, NETWORK COMPONENT, APPARATUSES, METHODS, AND COMPUTER PROGRAMS FOR A TRANSPORTATION VEHICLE AND A NETWORK COMPONENT

PRIORITY CLAIM

This patent application claims priority to European Patent Application Nos. 19154194.5, filed 29 Jan. 2019, and 19158934.0, filed 22 Feb. 2019, the disclosures of which are incorporated herein by reference in their entireties.

SUMMARY

Illustrative embodiments relate to a system, a transportation vehicle, a network component, apparatuses, methods, and computer programs for a transportation vehicle and a network component, more particularly, but not exclusively, to a concept for tele-operating a transportation vehicle to overcome an exceptional traffic situation.

BRIEF DESCRIPTION OF THE DRAWINGS

Disclosed embodiments will be described using the following non-limiting embodiments of apparatuses or methods or computer programs or computer program products by way of example only, and with reference to the accompanying figures, in which.

DETAILED DESCRIPTION

Document US 2018/0322775 A1 describes an Autonomous Vehicle Enhancement System (AVES) and method for monitoring and managing a virtual or existing fleet of autonomous vehicles in a transportation network and dispatching the autonomous vehicles to users. The AVES includes an AVES Central Operations Center (COC) that communicates with AVES vehicle equipment installed in the autonomous vehicles and AVES applications installed on computing devices accessible by the users. The AVES improves the operating efficiency of a transportation network by monitoring the condition of autonomous vehicles, optimizing the geographical distribution of the autonomous vehicles and optimizing assignment of the autonomous vehicles to users requesting services.

Document DE 10 2015 225 241 A1 describes a method in which a vehicle compares a trajectory of another vehicle driving in front to its own desired trajectory. If a similarity level of the trajectories is high enough, automated driving is used to follow the desired trajectory. If differences are high, manual driving can be used. Document DE 10 2015 225 242 A1 discloses a concept for determining a reference trajectory by a scout vehicle. The reference trajectory can be provided to following vehicles. A quality of the trajectory ultimately determines whether it is used by the following vehicles. Document DE 10 2015 213 743 A1 also describes a concept for determining a trajectory by a scout vehicle. A similarity between the environments of the scout vehicle and the following vehicles may determine whether the trajectory of the scout vehicle re-used. Document DE 10 2015 225 238 A1 discloses evaluation of a similarity of trajectories and a similarity of environments of scout and following vehicles. A safe drives mode may be activated in case of differences above a threshold.

Document US 2017/0045885 A1 describes computer devices, systems, and methods for an autonomous passenger vehicle. An unexpected driving environment can be identified. Information based on the unexpected driving environment received from one or more sensors disposed on the vehicle can be sent to a remote operator using a remote server. A command sent by the remote operator relating to one or more vehicle systems can be received. The command can be sent to the one or more vehicle systems for execution.

Conventional concepts consider management and organization of automated transportation vehicles. There are, however, traffic situations, which are difficult to resolve with fully automated driving algorithms. There is a demand for an improved concept for overcoming exceptional traffic situations for automated driving.

Disclosed embodiments are based on the finding that there are traffic situations, e.g., if an obstacle is in the regular way, which cannot be resolved by automated driving mechanisms. For example, if an object (parking/unloading transportation vehicle) blocks a one-way street a way passing the transportation vehicle may require driving a short section on the sidewalk. Driving on a side walk may, however, not be allowed in normal automated driving mode. Disclosed embodiments are based on the finding that once such an exceptional traffic situation is detected a communication with a network component can resolve the situation, for example, by switching to tele-operated driving and/or by receiving instructions on a route section that resolves the traffic situation.

Disclosed embodiments provide a method for a transportation vehicle to determine a route section. The method comprises operating the transportation vehicle in an automated driving mode and determining an exceptional traffic situation. The method further comprises transmitting information related to the exceptional traffic situation to a network component using a mobile communication system. The method further comprises receiving information related to driving instructions for the route section to overcome the exceptional traffic situation from the network component. The receiving of the driving instructions comprises tele-operating the transportation vehicle along the route section to overcome the exceptional traffic situation. Disclosed embodiments may enable network assisted route adaptation in case of unexpected traffic situations for automated driving. Disclosed embodiments may enable to switch from an automated driving mode to a tele-operated driving mode in case of an unexpected traffic situation. A tele-operator or tele-driver may then remotely steer the transportation vehicle out of the traffic situation.

The method may further comprise providing information related to an environmental model of the transportation vehicle, information related to transportation vehicle data, and information related to video data to the network component in addition to the information related to the exceptional traffic situation. Tele-operation may be enabled by disclosed embodiments through the provision of data from the transportation vehicle, e.g., environmental, video and sensor data such that a tele-operator may have a detailed representation of the transportation vehicle's traffic situation.

In some disclosed embodiments, during a first period of fully tele-operating, the method comprises transmitting video data with a first higher data rate and wherein, during a second period of partially tele-operating, the method comprises transmitting video data with a second lower data rate. Disclosed embodiments enable an adaption of a video data rate, where during an initial phase or period of the tele-operation the data rate may be higher than in a subsequent phase. Disclosed embodiments may enable efficient video data rate adaptation in tele-operated driving.

For example, during the second period of partially tele-operating, the method comprises transmitting video data in terms of visual snapshots. The data rate may be reduced by replacing a full video data stream with snapshots of a coarser time scale, e.g., when there are no obstacles or complications foreseen during a certain (partial) route section.

The method may further comprise receiving information related to a partial route section. During the second period of partially tele-operating, the tele-operating may be supported by at least partially maneuvering the transportation vehicle along the partial route section automatically. The method may then further comprise interrupting the at least partially automatic maneuvering, in case of a further exceptional traffic situation during the second period. Hence, the tele-operation may be aided by one or more sections of automated driving. During these sections the tele-operating may be in monitoring mode requiring less data. Disclosed embodiments may enable data rate reduction by combining tele-operation and automated driving.

The receiving of the driving instructions may comprise receiving information on the route section from the network component. The method may further comprise verifying, whether the information related to the route section is suitable for the transportation vehicle. The method may comprise automatically operating the transportation vehicle along the route section in case the information related to the route section is suitable for the transportation vehicle. Disclosed embodiments enable a verification at a transportation vehicle on whether a proposed route section suits its requirements, e.g., length, width, weight, type of the transportation vehicle etc.

Disclosed embodiments further provide a method for a network component to determine a route section for a transportation vehicle. The method comprises receiving information related to an exceptional traffic situation from the transportation vehicle using a mobile communication system. The method further comprises obtaining information related to driving instructions for the route section to overcome the exceptional traffic situation, and transmitting the information related to the driving instructions for the route section to the transportation vehicle and tele-operating the transportation vehicle out of the exceptional traffic situation. Disclosed embodiments enable a network component to assist an automated transportation vehicle in overcoming an exceptional traffic situation by at least partial tele-operation.

In further disclosed embodiments the obtaining of the information related to the driving instructions may comprise retrieving previously stored information related to the route section from a storage and/or by determining the route section based on receiving environmental information from the transportation vehicle. In disclosed embodiments tele-operation may be aided by using information about an environmental model of the transportation vehicle. Such information may enable more efficient data communication.

The method may further comprise receiving information related to an environmental model of the transportation vehicle, information related to transportation vehicle data, and information related to video data from the transportation vehicle in addition to the information related to the exceptional traffic situation. In disclosed embodiments availability of the information may enable fully tele-operated driving of a transportation vehicle. A tele-operator may have a similar experience as a real driver, because of the data available.

As lined out above, in some disclosed embodiments, during a first period of the tele-operation, the method may comprise receiving video data with a first higher data rate and during a second period of the tele-operation, the method may comprise receiving video data with a second lower data rate. A video data rate may be adapted to the needs of the tele-operation. For example, if there is a less critical partial route section, it may be solved using automated driving, but being monitored by a tele-operator. Disclosed embodiments may hence enable tele-monitored automated driving.

Disclosed embodiments also provide an apparatus for a transportation vehicle. The transportation vehicle apparatus comprises one or more interfaces, which are configured to communicate in a mobile communication system. The transportation vehicle apparatus further comprises a control module, which is configured to control the one or more interfaces. The control module is further configured to perform one of the methods described herein. Likewise, disclosed embodiments provide an apparatus for a network component, which comprises one or more interfaces configured to communicate in a mobile communication system. The network component apparatus further comprises a control module, which is configured to control the one or more interfaces. The control module is further configured to perform one of the methods described herein.

Further disclosed embodiments are a transportation vehicle comprising a disclosed embodiment of the transportation vehicle apparatus and a network component comprising the network component apparatus.

Disclosed embodiments further provide a computer program having a program code for performing one or more of the above described methods, when the computer program is executed on a computer, processor, or programmable hardware component. A further disclosed embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like way.

The terminology used herein is for the purpose of describing particular disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
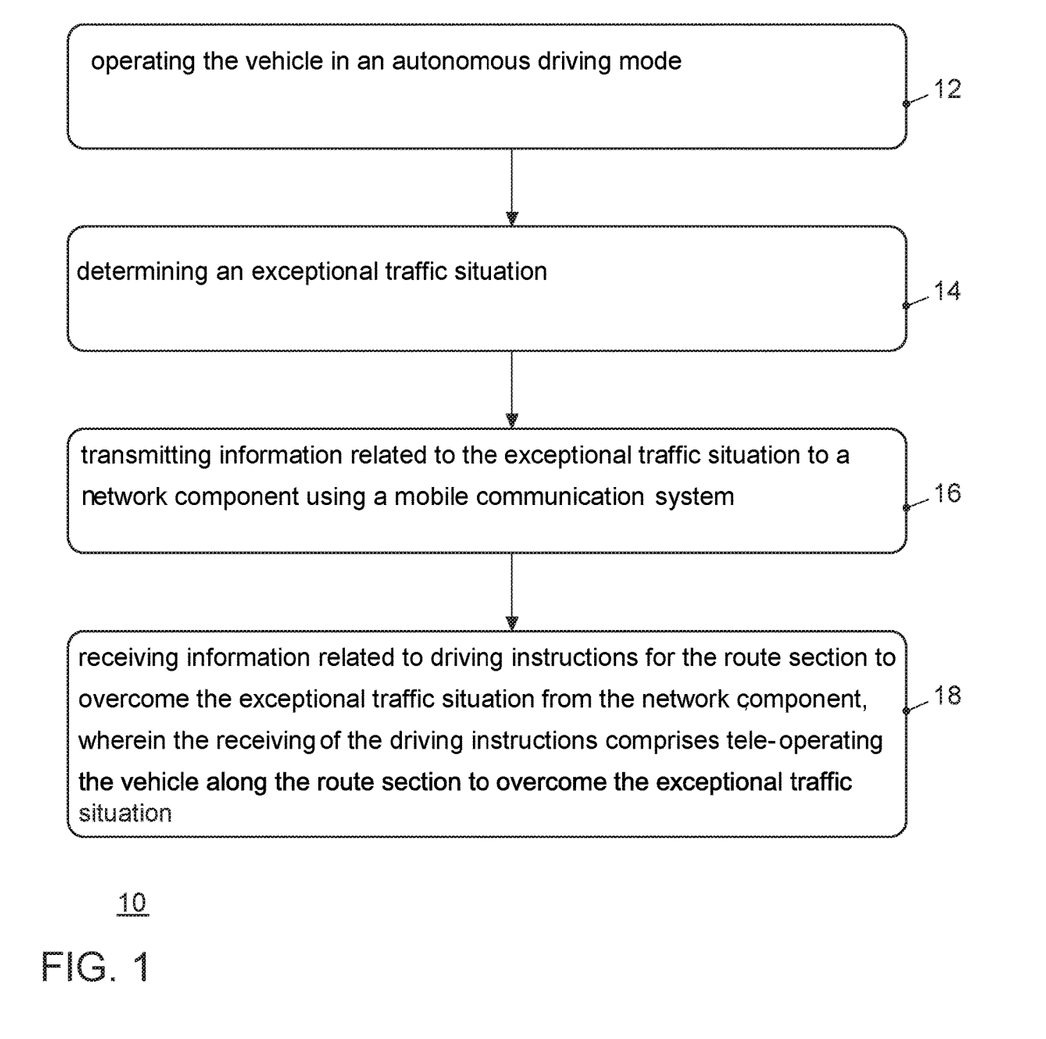
FIG. 1 shows a block diagram of an embodiment of a method for a transportation vehicle.

FIG. 1 illustrates a block diagram of a disclosed embodiment of a method 10 for a transportation vehicle to determine a route section. The method 10 comprises operating 12 the transportation vehicle in an autonomous/automated driving mode and determining 14 an exceptional traffic situation. The method 10 further comprises transmitting 16 information related to the exceptional traffic situation to a network component using a mobile communication system. The method further comprises receiving 18 information related to driving instructions for the route section to overcome the exceptional traffic situation from the network component, wherein the receiving 18 of the driving instructions comprises tele-operating the transportation vehicle 100 along the route section to overcome the exceptional traffic situation.

Figure 2:
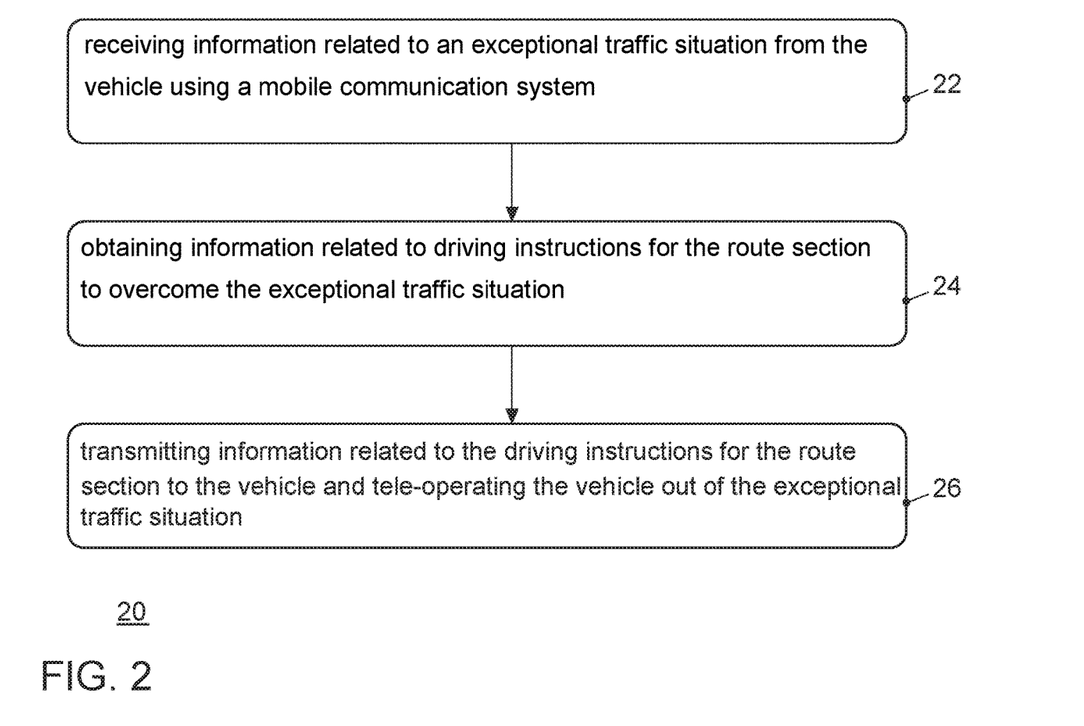
FIG. 2 shows a block diagram of an embodiment of a method for a network component.

FIG. 2 illustrates a block diagram of a disclosed embodiment of a method 20 for a network component to determine a route section for a transportation vehicle. The method 20 comprises receiving 22 information related to an exceptional traffic situation from the transportation vehicle using a mobile communication system. The method 20 further comprises obtaining 24 information related to driving instructions for the route section to overcome the exceptional traffic situation. The method 20 further comprises transmitting 26 information related to the driving instructions for the route section to the transportation vehicle 100 and tele-operating the transportation vehicle out of the exceptional traffic situation. As will be explained in more detail subsequently, examples for the information related to the driving instructions are control information from a remote-control center (tele-operated driving), information related to a stored path (determined before), which is known to at least partly overcome the unexpected traffic situation, or even instructions to at least partly manually operate the transportation vehicle.

Figure 3:
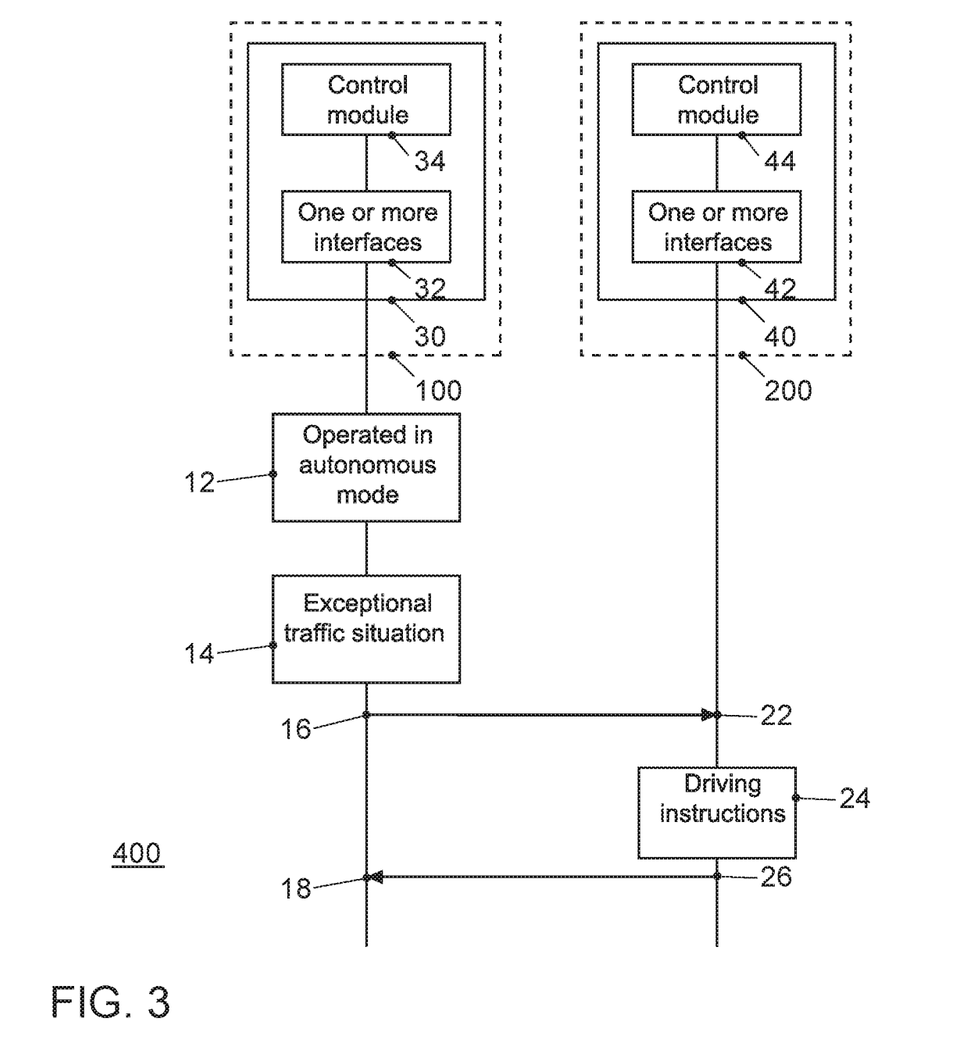
FIG. 3 shows embodiments of an apparatus for a transportation vehicle and a transportation vehicle, embodiments of an apparatus for a network component and a network component, and an embodiment of a system.

The mobile communication system 400, as shown in FIG. 3, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs. Here and in the following the network component may be a Control Center (CC), which controls remotely operated or tele-operated transportation vehicles. For example, it may correspond to a computer system displaying data (e.g., video streams) obtained from a transportation vehicle to an operator or remote driver of the transportation vehicle. Generally, such a CC may be located as close to a controlled transportation vehicle as possible to keep a latency of the video data in an uplink and the control or steering data in the downlink as short as possible. In some disclosed embodiments communication may be carried out via a base station, which may be collocated with the CC or located close to base station. Signaling may be routed directly from the CC to the transportation vehicle, i.e., on a shortest path to keep the latency and delay as short as possible.

A base station transceiver can be operable or configured to communicate with one or more active mobile transceivers/transportation vehicles 100 and a base station transceiver can be located in or adjacent to a coverage area of another base station transceiver, e.g., a macro cell base station transceiver or small cell base station transceiver. Hence, disclosed embodiments may provide a mobile communication system 400 comprising two or more mobile transceivers/transportation vehicles 100 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car using 802.11p, Dedicated Short Range Communication (DSRC), respectively.

FIG. 3 shows a disclosed embodiment of an apparatus 30 for a UE or transportation vehicle 100, a disclosed embodiment of an apparatus 40 for a network component, and a disclosed embodiment of a system 400. The apparatus 30 for the UE/transportation vehicle 100 comprises one or more interfaces 32 configured to communicate in the mobile communication system 400. The apparatus 30 further comprises a control module 34, which is coupled to the one or more interfaces 32 and which is configured to control the one or more interfaces 32. The control module 34 is further configured to perform one of the methods 10 as described herein.

The apparatus 40 for the network component 200 comprises one or more interfaces 42, which are configured to communicate in the mobile communication system 400. The apparatus 40 further comprises a control module 44, which is coupled to the one or more interfaces 42 and which is configured to control the one or more interfaces 42. The control module 44 is further configured to perform one of the methods 20 as described herein. The apparatus 40 may be comprised in a CC, a base station, a NodeB, a UE, a relay station, or any service coordinating network entity in disclosed embodiments. It is to be noted that the term network component may comprise multiple sub-components, such as a base station, a server, a CC, etc. A further disclosed embodiment is a transportation vehicle 100 comprising the apparatus 30 and/or a network component 200 comprising the apparatus 40.

In disclosed embodiments the one or more interfaces 32, 42 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 32, 42 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 32, 42 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 32, 42 may serve the purpose of transmitting or receiving or both, transmitting and receiving, information, such as information related to capabilities, application requirements, trigger indications, requests, message interface configurations, feedback, information related to control commands, QoS requirements, QoS time courses, QoS maps, etc.

As shown in FIG. 3 the respective one or more interfaces 32, 42 are coupled to the respective control modules 34, 44 at the apparatuses 30, 40. In disclosed embodiments the control modules 34, 44 may be implemented using one or more processing units, one or more processing devices, any method or mechanism for processing, such as a processor, a computer or a programmable hardware component being operable with accordingly adapted software. In other words, the described functions of the control modules 34, 44 may as well be implemented in software, which is then executed on one or more programmable hardware components. Such hardware components may comprise a general purpose processor, a Digital Signal Processor (DSP), a micro-controller, etc.

FIG. 3 also shows a disclosed embodiment of a system 400 comprising disclosed embodiments of UE/transportation vehicle 100, and a network component/base station 200 comprising the apparatus 40. In disclosed embodiments, communication, i.e., transmission, reception or both, may take place among mobile transceivers/transportation vehicles 100 directly and/or between mobile transceivers/transportation vehicles 100 and a network component 200 (infrastructure or mobile transceiver, e.g., a base station, a network server, a backend server, etc.). Such communication may make use of a mobile communication system 400. Such communication may be carried out directly, e.g., by Device-to-Device (D2D) communication, which may also comprise Vehicle-to-Vehicle (V2V) or car-to-car communication in case of transportation vehicles 100. Such communication may be carried out using the specifications of a mobile communication system 400.

In disclosed embodiments the one or more interfaces 32, 42 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

FIG. 3 also illustrates the methods 10 and 20 as described above. The apparatus 30 of the transportation vehicle 100 operated the transportation vehicle 100 in automated mode 12 if an exceptional traffic situation is determined 14. Such an exceptional situation may be any traffic situation that is unexpected or differs from an expectation according to routing information or map information available in the transportation vehicle 100. For example, the road may be blocked by another transportation vehicle, a construction side, an accident, flooding etc. Other exceptions may be a closed road, a closed tunnel, unexpected road conditions etc. The transportation vehicle itself may operate multiple sensor systems capturing data of the transportation vehicle's environment. Such data may comprise video data, imaging data, radar data, lidar data (light detection and ranging), temperature data, air pressure data, radio environment data, information received from other transportation vehicles, etc. Based on this data a matching can be carried out between the assigned route for automated driving and the sensor data. In some disclosed embodiments, as will be detailed in the sequel, the captured data is used to generate an environmental model of the transportation vehicle. This model may be a digital representation of the environment of the transportation vehicle possibly including other transportation vehicles, objects, roadside infrastructure, traffic signs, pedestrians, etc. Based on this model an unexpected situation can be detected, e.g., an obstacle is detected in the way and passing the obstacle would require passing through a forbidden area, e.g., sidewalk, opposite lane, etc. In some disclosed embodiments the exceptional situation may as well be determined by receiving a traffic message, e.g., a broadcast message from another transportation vehicle.

As further shown in FIG. 3 the transportation vehicle 100 then transmits 16 information related to the exceptional traffic situation to the network component 200 using a mobile communication system 400. From the perspective of the network component 200 the information related to the exceptional traffic situation is received 22 from the transportation vehicle 100. At the network component 200 information related to driving instructions for the route section to overcome the exceptional traffic situation can be obtained 24. Finally, information related to the driving instructions for the route section to the transportation vehicle is transmitted 26 and the transportation vehicle 100 is tele-operated out of the exceptional traffic situation, received 18 at the transportation vehicle, respectively.

Figure 4:
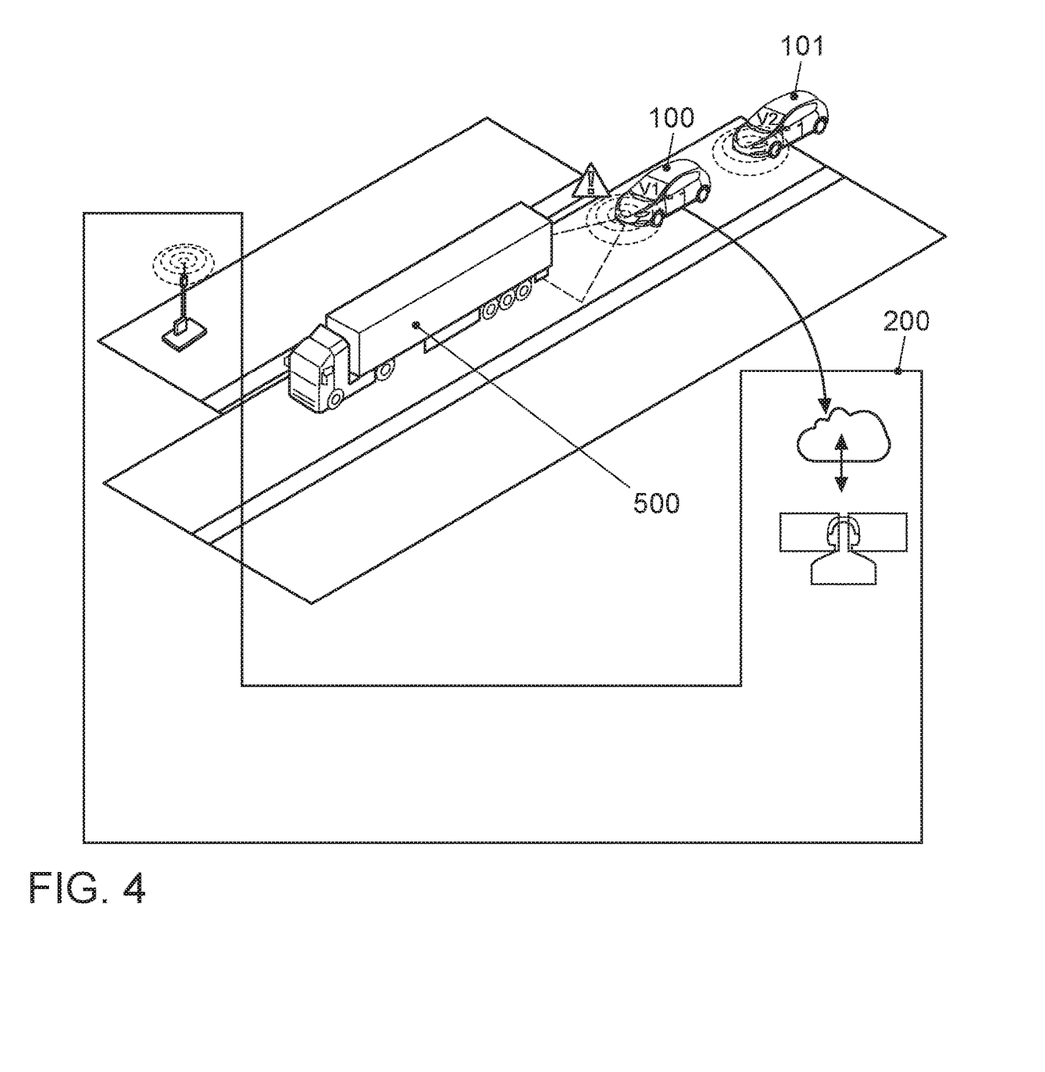
FIG. 4 illustrates an exceptional traffic scenario in an embodiment.

Disclosed embodiments may provide a concept for tele-operated driving based on a slim and partly further improved uplink and a locally proposed path. Tele-operated Driving (TD) is getting more and more interest. The main concept of TD is a transportation vehicle remotely driven by a control center (CC). Between CC and transportation vehicle may be a large distance. They are connected via a radio communication system (e.g., 5G, 4G . . . ) and their backhaul. In a disclosed embodiment a fully automatically driving transportation vehicle gets stopped (also referred to as SAE (Society of Automotive Engineers) level 5 (L5) transportation vehicle). For example, the automated transportation vehicle is not able to continue its planed route because it is not able to interpret the situation. FIG. 4 illustrates an exceptional traffic scenario in a disclosed embodiment, where a truck (obstacle 500) is blocking a one-way road. FIG. 4 shows an example of an exceptional situation, where autonomously driving transportation vehicles 100, 101 (L4/5) require tele-operating driving assistance.

It is assumed that transportation vehicles 100, 101 are automated transportation vehicles (L5). They would need to drive on the sidewalk to continue their planned route. In disclosed embodiments TD provides a solution for this scenario. Disclosed embodiments provide a concept for tele-operated driving based on control of data volumes at the uplink (e.g., hybrid uplink).

Disclosed embodiments may allow a reduction of data volume transmission (uplink) while a TD session is active.

It is been assessed previously that an autonomous transportation vehicle could experience situations where the transportation vehicle is no longer able to continue its planned route. As the transportation vehicle needs to adhere to all driving regulations, such situation, may require the interaction of a human operator that could interpret and decide what action can be performed by the transportation vehicle to overcome this type of event.

FIG. 4 depicts a situation, in which a truck 500 is blocking a one-way road. Incoming transportation vehicles V1, 100 and V2, 101 are autonomous transportation vehicles (L4/5) in the need to pass this obstacle 500. To overcome this event all transportation vehicles 100, 101 would need to drive over the sidewalk to continue their planed route.

Here TD may provide help by initiating a direct control of the first transportation vehicle V1, 100. Since the moment that the first TD session is requested by transportation vehicle 100, V1 to the CC 200 and the initial handshake among the two entities is established, the transportation vehicle 100 will be required to provide a minimum set of parameters, which will help the CC 200 to identify the requester, its current location and the environmental data of its surroundings. This means transportation vehicle 100 will need to start uploading high data streams in the uplink (UL) to the CC 200, as these data streams may contain radar images, lidar and camera data.

Transportation vehicles controlled via remote control are uploading high data streams in the uplink (UL) to the CC 200. In FIG. 4 it is assumed that the network component 200 comprises a base station (BS), the CC and some server/memory. As has been outlined above, in disclosed embodiments these components might not be collocated but located at different locations. In this description the term network component 200 shall summarize these components as one functional entity although they may be implemented as multiple physical entities. The distance between CC and the transportation vehicle 100 may contribute to the latency of any driving instructions before reaching the transportation vehicle and any data (video, sensor, etc.) being transmitted from the transportation vehicle to the CC. "Network component" and "Control Center" will be use synonymously herein.

The data steams provided by a remotely or tele-operated transportation vehicle may comprise radar images, lidar and camera data. Close by driving cars are "seeing" the same environment around them. This redundant data is occupying a considerable amount of bandwidth in the UL. For current technologies such as 4G, the UL is expected to be a bottleneck as the network was designed to support high downlink (DL) and low UL data rates. For TD it is vice versa: high UL (sensor data) and low DL (control data). Latency is also an issue here. Furthermore, each car needs to be driven manually via remote control. This implies that many drivers and CCs are needed. In a disclosed embodiment the receiving 18 of the driving instructions comprises tele-operating the transportation vehicle along the route section to overcome the exceptional traffic situation. The method 10 further comprises providing information related to an environmental model of the transportation vehicle 100, information related to transportation vehicle data, and information related to video data to the network component 200 in addition to the information related to the exceptional traffic situation in this disclosed embodiment. Likewise, the method 20 may further comprise receiving information related to an environmental model of the transportation vehicle, information related to transportation vehicle data, and information related to video data from the transportation vehicle 100 in addition to the information related to the exceptional traffic situation.

The information on the environmental model may allow decreasing a subsequent video data rate on the uplink. High data rates usually needed in the UL for teleoperated driving may be decreased in disclosed embodiments. In disclosed embodiments information related to transportation vehicle data and video data (e.g., with reduced data rate) may be provided to the network component 200 in addition to the information related to the exceptional traffic situation.

Each transportation vehicle 100, 101 may be controlled by one driver in the CC 200. Disclosed embodiments are further based on the finding that a path driven remotely by the CC 200 might be highly redundant with the path from a car remotely driven before. At least some disclosed embodiments therefore store information related to at least a partial route information or information related to driving instructions solving an unexpected traffic situation partially, such that the information can be re-used later on to solve the situation for other transportation vehicles 101 as well. In disclosed embodiments the storage or memory for storing information related to a path or a route may be any device capable of storing such information, examples are a hard drive, a flash drive, an optical storage medium, a magnetic storage medium, a solid state memory, any mass storage device, etc.

Figure 5:
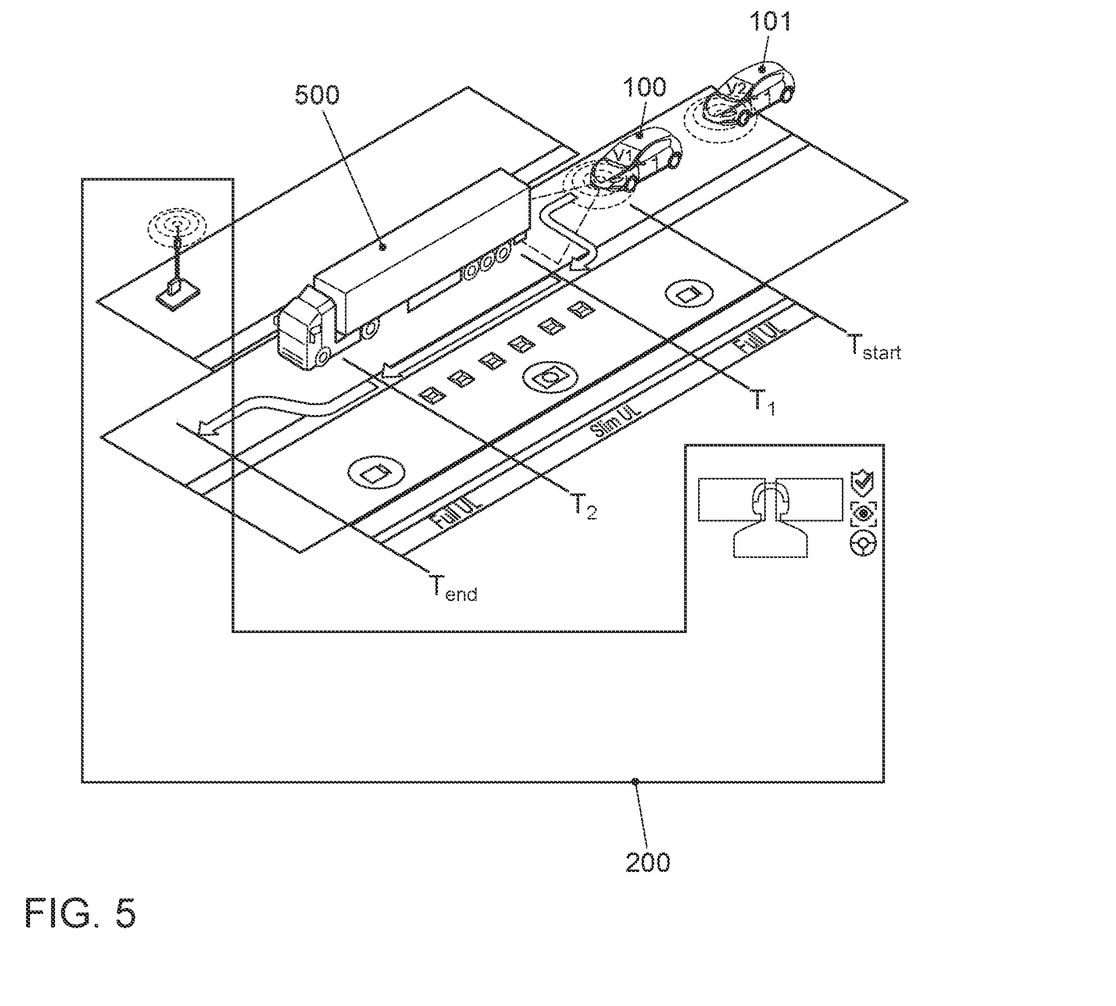
FIG. 5 illustrates details of a route section in an embodiment.

FIG. 5 illustrates details of a route section in a disclosed embodiment. FIG. 5 shows a more detailed figure of communication management between transportation vehicle 100 and CC 200 during a TD session showing a possible switching of a data package rate from full UL and a slim UL.

FIG. 5 illustrates the same scenario with the same components as introduced in FIG. 4.

In the following disclosed embodiment a method 10 that will allow the reduction of the data volume (in UL) depending on a stage, in which the transportation vehicle 100 will be operating while the TD session is active, is described. FIG. 5 depicts four points in time: Tstart, T1, T2 & Tend. These points separate three time periods, one at the beginning, Tstart-T1, one in the middle, T1-T2, and one at the end, T2-Tend.

As indicated in FIG. 5 the first period is the one taking transportation vehicle 100 over the sidewalk border, the second period takes transportation vehicle 100 over the sidewalk in a rather straight line, and the third period takes transportation vehicle 100 back on the street—again across the sidewalk border.

Different stages can be identified, in some of which a full uplink data flow is required and in others a slim uplink data flow can be used. Disclosed embodiments may offer a management process of the data rate supplied to the CC 200 with the premises to reduce redundant data, which occupies a considerable amount of bandwidth in the UL. Disclosed embodiments may consider current technologies such as 4G, where the UL is expected to be a bottleneck as the network was designed to support high download and low upload data rates.

Tele-operation may require high data rates in the UL, for which today technologies might not be designed. In some scenarios, each transportation vehicle may need to be controlled by one operator in the CC 200. This may lead to latency and costs for the Original Equipment Manufacturer (OEM).

In some disclosed embodiments, the control center may propose a path (via an indirect or direct control) based on the received environmental model (also German "Umfeldmodell", UMF)), transportation vehicle data and video data. When the transportation vehicle 100 is capable to drive by its own power but knowing it is in a TD drive mode that may activate a slim uplink data rate flow. During a first period of fully tele-operating, the method 10 may comprise transmitting video data with a first higher data rate from the transportation vehicle 100 to the network component 200. During a second period of partially tele-operating, the method 10 comprises transmitting video data with a second lower data rate from the transportation vehicle 100 to the network component 200. From the perspective of the network component 200, during a first period of the tele-operation, the method 20 comprises receiving video data with a first higher data rate and, during a second period of the tele-operation, the method 20 comprises receiving video data with a second lower data rate.

During the second period of time it may be expected that the transportation vehicle will apply the same rules as if it were driving on normal road conditions. For example, all available advanced driver assistance systems (ADAS) systems may react in case of further hazard situations could emerge in the new path (unexpected pedestrian movement, new obstacles detected, etc.). The "slim" UL may be composed of information related to "objects", which contain updated values of the environmental model, transportation vehicle data and visual "snapshots" of the environment to the CC 200, which will be continuously assessing the event until it reaches a "safe" point, in the subsequent stage (third period), the transportation vehicle 200 returns to a full UL rate allowing the CC 200 to place the unit to a position clear of obstacles and terminate the session of tele-operating driving.

As outlined above, during the second period of partially tele-operating, the method 10 may comprise transmitting video data in terms of visual snapshots. These snapshots may be photos at a certain time rate, e.g., 1 photo per 100 ms, 200 ms, 00 ms, 1 s, 2 s, 5 s, etc.

For example, the transportation vehicle 100 may receive information related to a partial route section for the duration of the second period of partially tele-operating. The tele-operating is then supported by at least partially maneuvering the transportation vehicle 100 along the partial route section (e.g., along the sidewalk in FIG. 5) automatically. The method 10 further comprises interrupting the at least partially maneuvering automatically in case of a further exceptional traffic situation during the second period, e.g., unexpected pedestrian movement, new obstacles detected, etc.

The generated path at the end of the session may be stored on a server close to the geographical location of the event and might be used by other transportation vehicles 101 after internal verification is carried out (plausibility check). In some disclosed embodiments the receiving 18 of the driving instructions comprises receiving information on the route section from the network component 200. The method 10 may then further comprise verifying, whether the information related to the route section is suitable for the transportation vehicle 100, For example, the transportation vehicle's height, width, type, and weight may be verified to fit the route proposal. The method 10 comprises automatically operating the transportation vehicle 100 along the route section in case the information related to the route section is suitable for the transportation vehicle 100.

The obtaining 24 of the method 20 for the network component 200 may comprise retrieving previously stored information related to the route section from a storage and/or by determining the route section based on receiving environmental information from the transportation vehicle 100. Such information may then be provided to the transportation vehicle 100 for autonomous operation during the second time period.

Disclosed embodiments may enable a hybrid uplink depending on the situation which the automated TD-driven transportation vehicle 100 is facing. For example, a slim up link may be used, which requires a highly accurate environmental model from the transportation vehicle 100 but for some situations a video support at the CC 200 might be required. Therefore, disclosed embodiments further enable a hybrid uplink depending on the situation. Here also direct control (remotely driven) and indirect control (proposed path) for the downlink control of the transportation vehicle may be used.

Instead of transmitting all sensor and video data to the CC 200 during the T1-T2 segment (second period), in disclosed embodiments the transportation vehicle 100 may upload its environmental model plus snapshot images from the camera unit at a defined frequency rate.

The procedure could be implemented as following:
1. First autonomous transportation vehicle stops (V1), 100, because current road regulations do not permit the transportation vehicle 100 to continue planned route.
2. Transportation vehicle 100 (V1) initiates trigger event to contact Command Centre (CC) 200 for support and sets itself in tele-operating driving mode (TD active).
3. If there is not a proposed path previously generated for this event at local server, the transportation vehicles 100 gets connected to the CC 100.
4. Transportation vehicle 100 (V1) transmits the environmental model (UMF), transportation vehicle and video data to the CC 200 (full UL).
5. The CC 200 positions transportation vehicle 100 (V1) remotely using the full UL data between $T_{start}$ and $T_1$, so it can clear out the obstacle in the original route plan and store the new validated section path for next transportation vehicle 101 (V2) use.
6. The CC 200 switches to a slim UL and oversees transportation vehicle 100 (V1) driving itself (on a reduced speed) between $T_1$ and $T_2$ distance. During this process the transportation vehicle 100 may stop due to new obstacle detection, if this happens, the transportation vehicle 100 may switch back to full UL so the CC 200 can assess the environment. Once transportation vehicle 100 (V1) reaches T2, the CC 200 proceeds to store subsequently the new additional validated section path for next transportation vehicle 101 (V2) use (The slim UL may consist of "periodical snapshots" plus UMF and transportation vehicle data.)
7. At $T_2$ position the transportation vehicle 100 (V1) will detect it is now positioned on a "obstacle free" location, where its maneuver planning system has assessed that might get back into the road. CC 200 with the aid of the snapshots and the transportation vehicle data information will be able to identify that the event is going to terminate.
8. Between $T_2$ and $T_{end}$ the transportation vehicle 100 will switch back to full UL so that CC 200 could validate the final maneuver so a return into normal road conditions is achieved. The new validated section path is stored subsequently. The final new validated section path can be used for the next transportation vehicle 101 (V2).
9. At $T_{end}$ the CC 200 will terminate the TD active session, terminate communication with transportation vehicle 100, and store complete generated path into the server close to the location of the path and/or in the CC 200.
10. Transportation vehicle 100 (V1) leaves the affected area and transportation vehicle 101 (V2) positions itself at the old position of transportation vehicle 100, V1.
11. The second transportation vehicle 101 (V2) triggers the request of a new TD session calling the CC 200. The CC 200 or the transportation vehicle 101 may assess if existing stored generated path from transportation vehicle 100, V1 should be used or proceed to generate a secondary path for further transportation vehicles to follow.

The maneuver planning (MP) of transportation vehicle 101, V2 may compare the proposed path with its own conditions, transportation vehicle length, width, type, etc. Transportation vehicle V2 101 may either uses the proposed path as a result or may reject it and proceed with a new TD full UL session with the CC 200. This may happen if transportation vehicle 101, V2 is a truck and transportation vehicle 100, V1 is a car. The truck 101 may not be able to follow the path determined by car 100.

Disclosed embodiments may enable a slim uplink, which is an uplink communication with reduced data rate compared to a full uplink used for full tele-operation. For example, disclosed embodiments may just transmit environmental model data (UMF), transportation vehicle data (e.g., height, width, weight, . . . ) and periodical snapshot images in the UL instead of transmitting data like radar, lidar and constant video stream.

The CC 200 (network component, tele-operated driving server (TD server)) may store the final generated proposed path from sections: (Tstart-T1), (T1-T2), (T2-Tend) adding additional information such as: type of transportation vehicle applicability, timestamp of event, distance taken to clear obstacle, etc.

The TD server 200 should be located close to the geographical position of the proposed path to reduce latency.

The TD server could also be located at a car or in infrastructure like traffic lights and shared via side-link.

Figure 6:
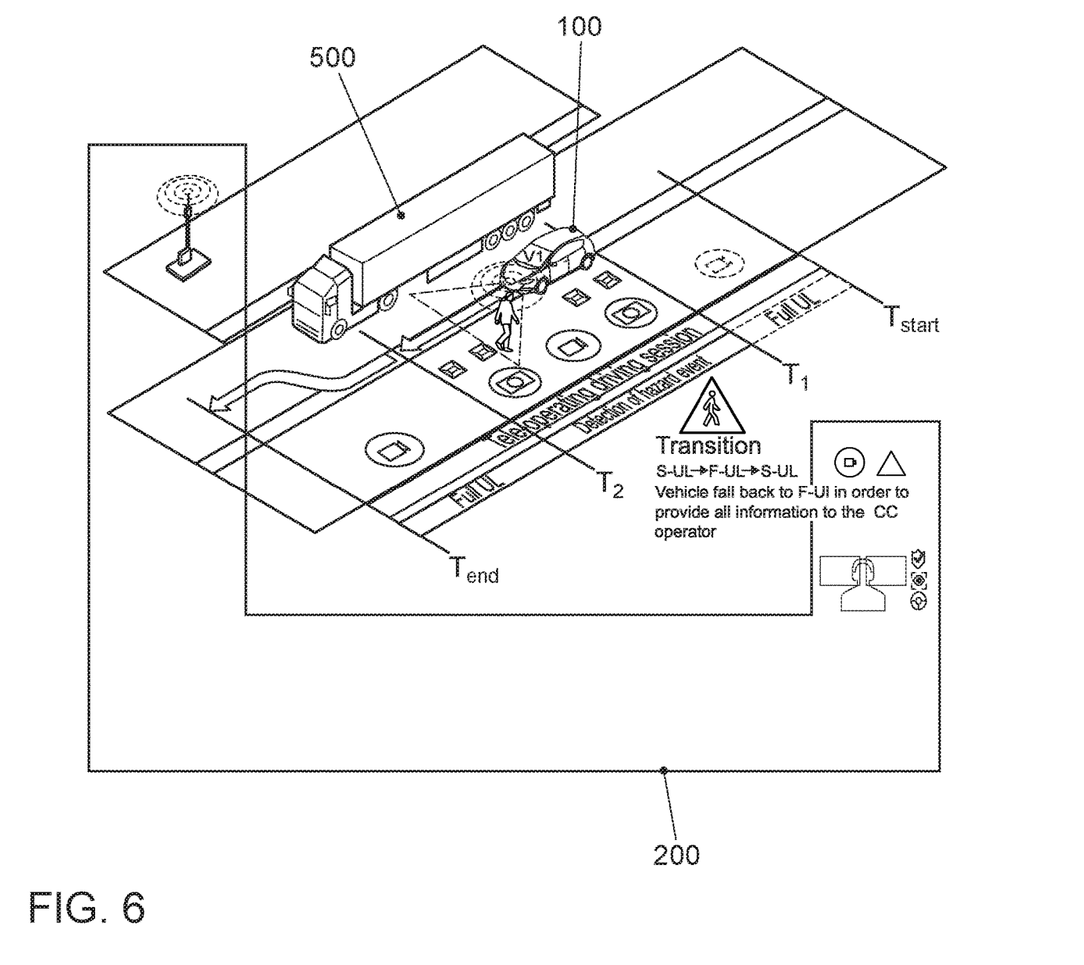
FIG. 6 shows additional detection of an exception in an embodiment.

FIG. 6 shows additional detection of an exception in a disclosed embodiment. In some disclosed embodiments additional detection of hazard events during slim UL segment may take place. FIG. 6 shows a transportation vehicle management mechanism to grant full-UL to a CC operator for assessment in case of a further exception. FIG. 6 shoes the same scenario as FIGS. 4 and 5, but as transportation vehicle 100 passes the truck 5000 during the second period in an automated mode, a pedestrian suddenly occurs and the transportation vehicle 100 notifies the CC 200. Thereupon it is switched back to fully-UL (fully tele-operation). In the event of a new hazard detected (e.g., a Pedestrian) the autonomous transportation vehicle may stop and switch back to full-UL (fully tele-operated) mode. An operator at the CC 200 may then assess the new situation to react accordingly. This is indicated by the operator symbol in FIG. 6.

Disclosed embodiments provide a mechanism/procedure that allows OEMs reducing the data flow that should be generated by the transportation vehicles 100, 101 towards the remote command center 200. Disclosed embodiments may help reducing of potential high cost for the transportation vehicle OEMs to send high rate data packages to the Command Centre 200 entity.

In disclosed embodiments an automated transportation vehicle 100 may get a proposed path, this means it can accept it after internal evaluation or it might reject it. The CC 200 may draw this path based on the environmental model and the video data (slim uplink) or creates it when driving the path with another transportation vehicle remotely.

For example, transportation vehicles 100, 101 may provide the following content or conditions to the network component 200:
geographical position of path
distance from path to obstacles (width of the new lane)
time stamp
further environmental information Disclosed embodiments may enable a slim uplink, i.e., reduced uplink data for remote or tele-operated driving. This may be achieved by transmitting the environmental model (UMF), transportation vehicle data (e.g., height, width, weight, . . . ) and video data in the uplink instead of transmitting more data like radar, lidar and other sensor data. In disclosed embodiments a tele-operated driving server (TD server) may be used and the CC 200 may store a proposed path. The server may be located close to the geographical position of the proposed path to reduce latency. The TD server could also be located at a car or in infrastructure like traffic lights and shared via side-link.

In some disclosed embodiments the process or method may be divided in five reference segments in time, as also lined out in FIGS. 5 and 6:
A) $T_{start}$,
B) $T_{start}$-$T_1$,
C) $T_1$-$T_2$,
D) $T_2$-$T_{end}$,
E) $T_{end}$.

A) The $T_{start}$ mark depicts the section in which:
1. Transportation vehicle 100 "initiates" communication with CC 200.
2. CC 200 sets "Governance" over transportation vehicle 100.
3. CC 200 receives full dataset from transportation vehicle 100 to assess situation.
4. CC 200 evaluates method of control to apply (direct or indirect control).

During this phase transportation vehicle 100 initiates the TD session ("governance" process) via request to the CC 200. This may also relate to a service condition in the network, some network requirements may have to be fulfilled (coverage, service availability), video streaming may be enabled, and sensor data transmission may be enabled (e.g., lidar).

A CC operator may receive a full-UL with all content delivered by transportation vehicle 100. With the data provided, the CC 200 operator assesses the zone to define a trajectory to take to avoid the obstacle (route leading out of the exceptional traffic situation). After the operator has evaluated the situation it is decided to take over direct control.

B) The Tstart-T1 segment depicts the section in which:
1. The CC 200 takes "direct" control of the transportation vehicle 100 to position it on a new path/route. The CC 200 operator proceeds with direct control and steers the transportation vehicle 100 at low speed. Environmental, sensor and video data are provided as constant information to the CC operator until the transportation vehicle 100 reaches the T1 section.

The CC 200 supervises and controls maneuvers of the transportation vehicle 100. For example, the CC 200 may execute maneuvers to position the transportation vehicle "off the road" (e.g., on the sidewalk). During this period the full-UL applies.

C) The T1-T2 segment depicts the process in which:
1. The CC 200 "supervises" the transportation vehicle maneuvering using a reduced dataset from the transportation vehicle 100 (slim-UL). For example, a video stream is replaced by a sequence of still images.
2. In the eventuality that new hazards are:
  a. detected by the transportation vehicle 100, automatically the CC 200 will be switched back to full control and a full dataset is transmitted, allowing the CC 200 to assess the situation and identify a next action to take. (Back to A.3)
  b. not detected by the transportation vehicle 100 but assessed by the CC operator that there is a hazard, the CC 200 will take control back of the transportation vehicle 100 to STOP it.
3. If no additional hazards are detected, CC returns to "supervise" transportation vehicle maneuvering and waits for the original obstacle to be overcome.

At T1 the transportation vehicle 100 switches into a slim-UL. Video data flow is now replaced by a series of still images (snapshots) of the zone. Environmental, sensor and transportation vehicle data remain being fed to the CC operator. The transportation vehicle 100 assesses the new "off road" conditions and starts driving forward.

The CC 200 maintains surveillance of the environment.

In the event of new hazard detected (e.g., pedestrian detected by the transportation vehicle 100 itself of the CC 200 based on the slim-UL data), the transportation vehicle 100 stops and switches back to full-UL mode. The CC operator may assess the new situation to react accordingly.

With the environmental, sensor and image data the CC operator may determine that the transportation vehicle 100 has reached the T2 segment. The CC operator may then initiate "direct control" process to take transportation vehicle back to "road" conditions.

D) The T2-Tend segment depicts the section in which:

1. The CC 200 switches back to the full dataset from transportation vehicle 100 to return the transportation vehicle 100 into normal road conditions.

2. The CC 200 maneuvers the transportation vehicle 100 until it reaches an accepted location in the road to resume its planned route.

The CC operator supervises and steers the transportation vehicle 100 with aid of the full-UL data. The CC operator may confirm road conditions in search of no further hazards. The CC operator determines that TD "governance" session has reached its end and returns full control to autonomous transportation vehicle 100. During this period the CC 200 controls the transportation vehicle 100. The CC 200 executes maneuvers to return the transportation vehicle to the "normal" road conditions. The CC 200 determines when the transportation vehicle 100 has reached its final position.

E) The Tend mark depicts the section in which:

1. The CC 200 ends the "Controlling, Supervision and Governance" of the tele operating driving session.

2. The CC 200 proceeds to perform event management tasks to "log" the event, timestamps, transportation vehicle type, environmental conditions, etc.

3. The CC 200 may terminate all activities "storing" the event at the closest "TD remote server" in the vicinity of the event, either to be broadcasted or be used as reference for the next incoming request originated at same location.

The CC operator may store information related to the event/route at a closest remote server. A remote server may broadcast stored events to next incoming transportation vehicles 101. Transportation vehicle 100 may resume autonomous driving.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and disclosed embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim.

It is further to be noted that methods disclosed in the specification or in the claims may be implemented by a device having a way for performing each of the respective operations of these methods.

LIST OF REFERENCE SIGNS

10 method for a transportation vehicle
12 operating the transportation vehicle in an autonomous/automated driving mode
14 determining an exceptional traffic situation
16 transmitting information related to the exceptional traffic situation to a network component using a mobile communication system
18 receiving information related to driving instructions for the route section to overcome the exceptional traffic situation from the network component, wherein the receiving of the driving instructions comprises tele-operating the transportation vehicle along the route section to overcome the exceptional traffic situation
20 method for a network component 22 receiving information related to an exceptional traffic situation from the transportation vehicle using a mobile communication system
24 obtaining information related to driving instructions for the route section to overcome the exceptional traffic situation
26 transmitting information related to the driving instructions for the route section to the transportation vehicle and tele-operating the transportation vehicle out of the exceptional traffic situation
30 apparatus for transportation vehicle
32 one or more interfaces
34 control module
40 apparatus for network component
42 one or more interfaces
44 control module
100 transportation vehicle
101 transportation vehicle
200 network component
400 mobile communication system
500 obstacle (truck, construction site)

The invention claimed is:

1. An apparatus for a transportation vehicle, the apparatus comprising:
one or more interfaces to communicate in a mobile communication system; and
a control module configured to control the one or more interfaces, wherein the control module is further configured to determine a route section by:
operating the transportation vehicle in an automated driving mode during which occurrence of an unexpected traffic situation is determined as a non-traditional vehicle impediment that differs from an expectation according to routing or map information available in the transportation vehicle necessitating at least partial discontinuation of the automated driving mode;
transmitting information related to the unexpected traffic situation to a network component via a mobile communication system, including transmitting video data with a first higher data rate responsive to operation in a first period of fully remote tele-operating along the route section to overcome the unexpected traffic situation;
receiving, from the network component, information related to driving instructions for the route section to overcome the unexpected traffic situation, wherein the receiving of the driving instructions comprises remotely tele-operating the transportation vehicle along the route section to overcome the unexpected traffic situation; and
transmitting video data with a second lower data rate responsive to operation in a second period of partially remote tele-operating including combined remote tele-operation and automated driving.

2. The apparatus of claim 1, the control module being further configured to determine the route section by providing information related to an environmental model of the transportation vehicle, information related to transportation vehicle data, and information related to video data to the network component in addition to the information related to the unexpected traffic situation.

3. A network component comprising the apparatus of claim 2.

4. The apparatus of claim 1, wherein during the second period of partially tele-operating, the method comprises transmitting video data in terms of visual snapshots.

5. The apparatus of claim 1, the control module being further configured to determine the route section by receiving information related to a partial route section, wherein during the second period of partially tele-operating, the tele-operating is supported by at least partially maneuvering the transportation vehicle along the partial route section automatically, wherein, during the second period, the at least partially maneuvering is interrupted automatically in response to a further unexpected traffic situation.

6. The apparatus of claim 1, wherein the receipt of the driving instructions comprises receiving information on the route section from the network component, wherein the control module is further configured to verify whether the information related to the route section is suitable for the transportation vehicle, and wherein the transportation vehicle is automatically operating along the route section in response to the information related to the route section is suitable for the transportation vehicle.

7. A transportation vehicle comprising the apparatus of claim 1.

8. A non-transitory computer readable medium including computer program code for performing operations of the control module of claim 1 when the computer program code is executed on a computer, a processor, or a programmable hardware component.

9. The apparatus of claim 1, wherein the unexpected traffic situation includes a blocked roadway.

10. An apparatus for a network component, the apparatus comprising:
one or more interfaces to communicate in a mobile communication system; and
a control module configured to control the one or more interfaces, wherein the control module is further configured to determine a route section for a transportation vehicle by:
receiving information related to occurrence of an unexpected traffic situation, as a non-traditional vehicle impediment that differs from an expectation according to routing or map information available in the transportation vehicle necessitating at least partial discontinuation of the automated driving mode, from the transportation vehicle using a mobile communication system, including receiving video data with a first higher data rate responsive to operation in a first period of the remote tele-operation;
obtaining information related to driving instructions for the route section to overcome the unexpected traffic situation;
transmitting information related to the driving instructions for the route section to the transportation vehicle and remotely tele-operating the transportation vehicle through the unexpected traffic situation, wherein the information includes information that is related to an environmental model of the transportation vehicle, related to transportation vehicle data, and related to video data from the transportation vehicle in addition to the information related to the unexpected traffic situation; and
receiving video data with a second lower data rate responsive to operation in a second period of the remote tele-operation including combined remote tele-operation and automated driving.

11. The apparatus of claim 10, wherein the obtaining of the information related to the driving instructions comprises retrieving previously stored information related to the route section from a storage and/or by determining the route section based on receiving environmental information from the transportation vehicle.

12. A non-transitory computer readable medium including computer program code for performing operations of the control module of claim 10 when the computer program code is executed on a computer, a processor, or a programmable hardware component.

13. A method for a transportation vehicle to determine a route section, the method comprising:
- operating the transportation vehicle in an automated driving mode;
- determining occurrence of an unexpected traffic situation as a non-traditional vehicle impediment that differs from an expectation according to routing or map information available in the transportation vehicle necessitating at least partial discontinuation of the automated driving mode;
- transmitting information related to the unexpected traffic situation to a network component via a mobile communication system, including transmitting video data with a first higher data rate responsive to operation in a first period of fully remote tele-operating along the route section to overcome the unexpected traffic situation;
- receiving, from the network component, information related to driving instructions for the route section to overcome the unexpected traffic situation, wherein the receiving of the driving instructions comprises remotely tele-operating the transportation vehicle along the route section to overcome the unexpected traffic situation; and
- transmitting video data at a second lower rate responsive to operation in a second period of partially remote tele-operating including combined remote tele-operation and automated driving.

14. The method of claim 13, further comprising providing information related to an environmental model of the transportation vehicle, information related to transportation vehicle data, and information related to video data to the network component in addition to the information related to the unexpected traffic situation.

15. The method of claim 13, wherein during the second period of partially remote tele-operating, video data is transmitted as visual snapshots.

16. The method of claim 13, further comprising receiving information related to a partial route section,
- wherein during the second period of partially remote tele-operating, the tele-operating is supported by at least partially maneuvering the transportation vehicle along the partial route section automatically,
- wherein the method further comprises interrupting the at least partially maneuvering automatically in response to a further unexpected traffic situation during the second period.

17. The method of claim 13, wherein the receiving of the driving instructions comprises receiving information on the route section from the network component and wherein the method further comprises verifying, whether the information related to the route section is suitable for the transportation vehicle, and wherein the method further comprises automatically operating the transportation vehicle along the route section in response to the information related to the route section being suitable for the transportation vehicle.

18. A method for a network component to determine a route section for a transportation vehicle, the method comprising:
- receiving information related to an unexpected traffic situation, as a non-traditional vehicle impediment that differs from an expectation according to routing or map information available in the transportation vehicle necessitating at least partial discontinuation of the automated driving mode, from the transportation vehicle using a mobile communication system;
- obtaining information related to driving instructions for the route section to overcome the unexpected traffic situation;
- transmitting information related to the driving instructions for the route section to the transportation vehicle and tele-operating the transportation vehicle out of the unexpected traffic situation;
- receiving information related to an environmental model of the transportation vehicle, information related to transportation vehicle data, and information related to video data from the transportation vehicle in addition to the information related to the unexpected traffic situation, including receiving video data at a first higher data rate responsive to operation in a first period of fully remote tele-operation; and
- receiving video data at a second lower data rate responsive to operation in a second period of the remote tele-operation including combined remote tele-operation and automated driving.

19. The method of claim 18, wherein the obtaining of the information related to the driving instructions comprises retrieving previously stored information related to the route section from a storage and/or by determining the route section based on receiving environmental information from the transportation vehicle.

* * * * *